Figure 1:
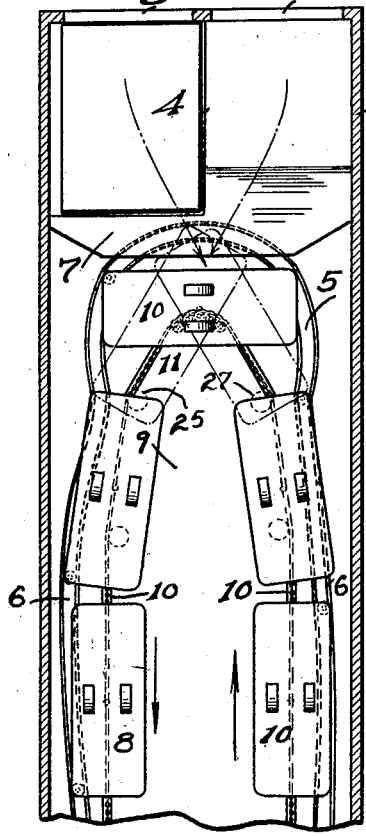

April 14, 1931.   J. D. BELL   1,800,495
STORE ROOM FOR VEHICLES
Filed April 4, 1928   2 Sheets-Sheet 1

INVENTOR.
Joseph D. Bell.
BY Carlos P. Griffin
ATTORNEYS.

WITNESS

April 14, 1931. J. D. BELL 1,800,495
STORE ROOM FOR VEHICLES
Filed April 4, 1928 2 Sheets-Sheet 2
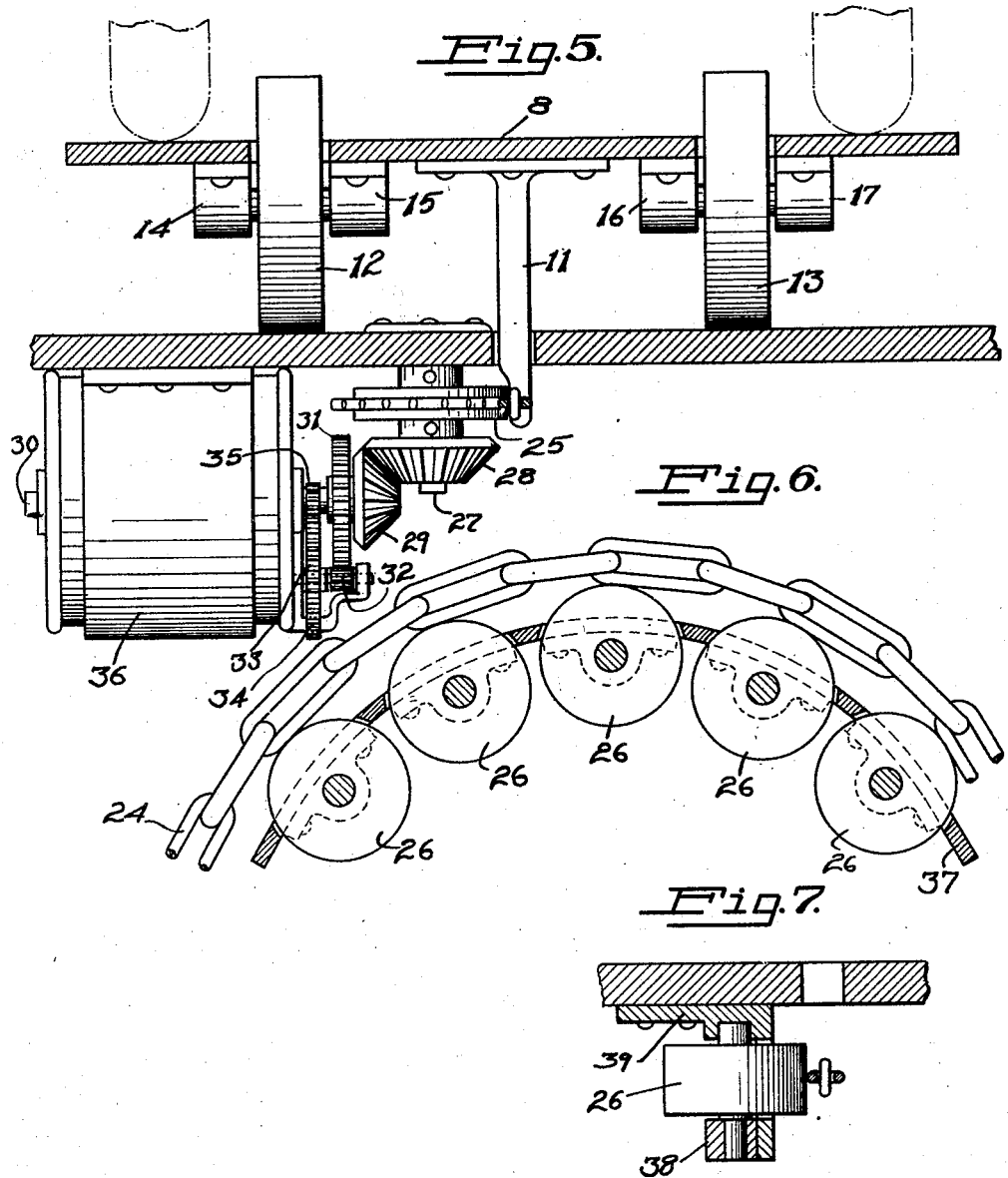
INVENTOR.
Joseph D. Bell.
WITNESS BY
Alfred J. Thibodeau Carlos P Griffin
ATTORNEYS.

Patented Apr. 14, 1931

1,800,495

UNITED STATES PATENT OFFICE

JOSEPH D. BELL, OF SAN FRANCISCO, CALIFORNIA

STOREROOM FOR VEHICLES

Application filed April 4, 1928. Serial No. 267,144.

This invention relates to a store room for vehicles, and its object is to provide for the storage of a maximum number of vehicles of any kind, automobiles or other vehicles of that character, in a narrow buiding, and to provide means whereby each one of the vehicles may be readily brought to the position from which it can be moved from the building at the desire of the person placing the vehicle therein.

It will be understood by those skilled in the art, that the question of storing automobiles is a very serious one in cities where such large numbers of machines are required to be stored in a small space, and where the storage space is at such a premium as it is on small lots, frequently from twenty to twenty-five foot lots where it becomes necessary to provide a turntable of some kind for the vehicles. The turntable at either end of the building is not a solution of the problem for the reason that when the building is full of machines it is impossible to get at one in middle part of the building without moving all of the vehicles, but with the present invention means is provided whereby the entire line of vehicles can be easily moved to bring any one of the series of machines to a place where it may be run off the carrier and a new machine put in place, or any other machine of the series brought to the place from which they are all removed.

In the present invention a plurality of platforms which are capable of supporting the automobile are provided, said platforms being chiefly carried upon two wheels with a caster wheel at each end which is ordinarily out of contact with the floor except as the platform is unbalanced by the loading of the machine, and this of course is always balanced as nearly as may be at the time the automobile is placed upon the platform.

An object of the invention is to provide means for placing the automobiles on the platforms under which the platforms can move, while at the same time the automobiles can be run off the platform on the same, thereby making it possible to supply the building with a runway from the street, and another runway to an elevator which can take the machines either from the street, or from one floor to another floor as may be desired, and of course for the present purposes it is only necessary to provide a building with approximately eight foot ceilings because of the fact that such automobiles that are ordinarily stored in places of this character are not over that height.

With the present invention it becomes possible to store twelve cars on each floor of a building built on a twenty foot lot 120 feet deep, the platforms being about six feet over all in width, by about eighteen feet in length, the space between the successive platforms being only sufficient to permit the corners of the one platform to pass the end of the next adjacent platform when the turn is made at the end of the building.

In the present case one platform is brought to the end of the building and turned to a convenient position for driving the car thereon. When the car has been placed upon the platform the motor for moving all of the cars is operated, and the chain moved to such a position to bring that platform out of the way whereupon the next adjacent platform is brought to the position to have a car placed thereon, or to have a car removed therefrom as may be desired, and in the event that any car of the series is desired the platform is operated until that particular car is brought to the end of the building, where it may be driven to the elevator or driven in the street as may be desired.

Another object of the invention is to provide means for driving the chain which operates the platforms as a whole slow enough to prevent the cars from being dislodged therefrom by accident, and to reduce the size of the motor necessary to move all of the cars around the building, a special set of reduction gears being used for this purpose.

Another object of the invention is to provide a cam for directing all of the platforms in the proper position at every point of their travel around the building, thereby preventing the cars from coming into contact with one another, and holding all of the cars at a fixed distance apart, all of the platforms being connected by means of a centrally placed post to a movable chain, and each platform having a guide roller extending into cam tracks.

Another object of the invention is to provide means for storing a series of automobiles upon a series of trucks in such a way as to take two lines of machines lengthwise and to turn the trucks upon which the trucks are carried in a building of a width less than twice the length of one of the trucks.

An embodiment of the invention is shown in the accompanying drawings in which the same reference numeral is applied to the same portion throughout the several figures of the drawings and of which there may be modifications.

Figure 2:
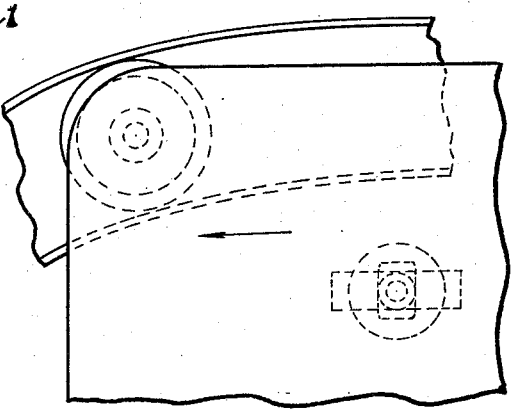
Figure 3:
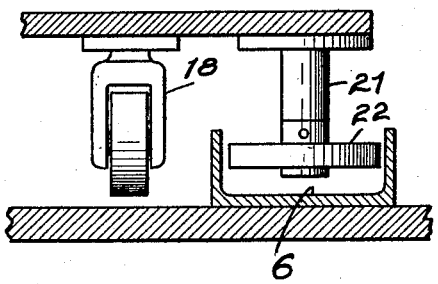
Figure 4:
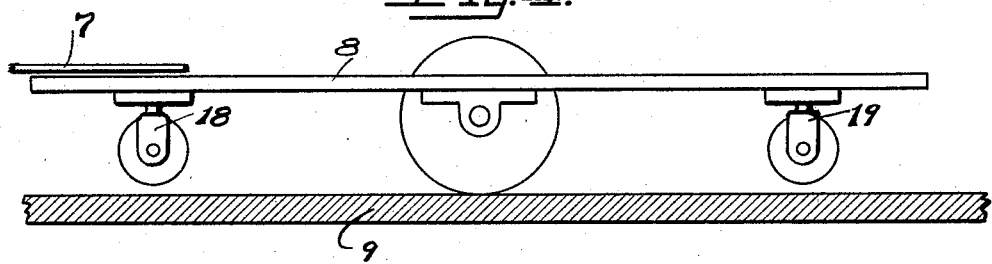

Figure 1 is a plan view of a portion of one end of a building having this system of storage truck applied thereto, Figure 2 is a plan view of a portion of one of the trucks showing the application of the guiding roller thereto in connection with a portion of the cam used for carrying the truck around in the building, Figure 3 is a sectional view of a portion of one of the trucks showing the guiding roller, and one of the caster rollers adjacent the same, Figure 4 is a side elevation of one of the trucks showing one of the pair of large supporting wheels, and both of the caster wheels, Figure 5 is a sectional view of one of the trucks adjacent the main supporting wheels, and showing the supporting floor in section with the driving motor also shown.

Figure 6 is a horizontal view in plan of the rollers at the corner of the building around which the driving chain travels, said rollers being so arranged as to reduce the acceleration of changing the position of the truck from one side of the building to the other side of the building, and Figure 7 is a view partly in section of one of the rollers shown in Figure 6 showing the relation of the chain thereto.

The building is indicated at 1 and it has the entrances at 2 and 3 from which the machines may be driven into the building from the street, while the elevator 4 receives any machines driven through the entrance 3.

It will be understood that the building may be of any desired number of stories, each story being of the height suitable to the desired kind of machines to be placed in that particular floor.

Extending entirely around the floor of the building is a channel cam track 5, said track being curved at each end as shown in the upper portion of Figure 1, and extending along side of the wall of the building as indicated at 6. At that end of the building where the elevator and entrances are, the building is provided with a steel floor 7 which is slightly higher off the floor than the top of the truck 8, so that a car coming into the building can drive up onto the truck at the elevator by simply depressing the edge of the platform 7 into contact with the top of the truck that happens to be positioned adjacent said platform. Any other truck of the series passes under said platform when the same comes adjacent the same.

The floor of the building is indicated at 9, and it has a continuous groove 10 entirely around the same, through which an arm 11 carried by the truck floor 8 projects for carrying the truck around the building. Each of the trucks is provided with two large supporting wheels as indicated at 12 and 13, said wheels being journalled in boxes 14, 15, 16 and 17, and in order to lower the platform 8 as much as possible the wheels 12 and 13 project through the platform, as indicated in Figures 1 and 5. At each end of the truck there are the caster wheels 18 and 19 as shown in Figure 4, said caster wheels being arranged to be about one-half inch off the floor when the platform 8 is level, all of the weight of the automobile being carried by the two central wheels when the machine is nicely balanced. Adjacent one corner of each truck there is a depending standard 21, which standard has a roller 22 which roller is engaged by the sides of the channel iron 6, which forms the track for guiding the movement of the truck, and it will be noted that this channel narrows just before the main curve is reached at the end of the building in order to bring the truck slightly together before the curve is made so as to bring the truck member inwardly a little before the turn is made to make certain that it will clear the walls of the building as the truck is turned around.

The trucks are turned around by means of a chain 24 which chain passes around the drive pulley 25, a series of idle pulleys 26, of which there may be any desired number, and another idling pulley 27, the pulley arrangement being substantially identical at both ends of the building. The pulley 25 is of a well known type to drive the chain 24, and it is carried by the shaft 27 which has a bevel gear 28 in mesh with a bevel gear 29 loosely mounted on the motor shaft 30. The bevel gear 29 also carries a large gear 31 which is in mesh with a small gear 32 carried by a shaft 33 which shaft also carries the large gear 34, the latter being driven by a small gear 35 on the shaft of the motor 36.

In order to insure the proper operation of the chain at the ends of the run there is a steel plate 37 through which the series of rollers 26 projects, and bearings 38 with upper bearings 39 secured to the floor, support all of the rollers 26.

The operation of the apparatus is as follows: Assuming a car to be coming into the garage from the elevator, or from the floor, or street doorway, the first truck of the series is placed in a suitable position for the driver to drive thereonto. The motor 36 is then operated to pull the entire chain of cars up to a position which will enable another car to be run onto the adjacent truck, and the same operation is repeated until all of the trucks are filled, said trucks, when arranged in this manner being capable of holding twelve cars in a space which would ordinarily permit the storage of seven cars only. When any car of the series is desired to be taken out of the building, the motor is operated to bring that particular car to one end of the truck whereupon the car is run out of the building or onto the elevator on its own power. Owing to the fact that the speed of movement of the chain is very slow, it requires a very small motor to shift the entire train of cars, but at the same time it only requires a minute or two to bring any car of the series to the place for it to be driven out of the building.

Having thus described my invention, what I desire to secure by Letters Patent of the United States is as follows, but modifications may be made in carrying out the invention as shown in the drawings and in the above particularly described form thereof, within the purview of the annexed claims.

1. A storage building comprising a room, a series of trucks, a pair of large wheels near the center of each truck to support the main weight thereof, smaller caster wheels at the ends of the truck to hold the truck substantially horizontal, means to operate all the trucks to bring each one to the end of the room successively, and a cam track to turn the trucks around at each end of the room, an overhanging platform at one end of the building to allow wheeled vehicles to drive on the trucks, said cam track at the end adjacent to the platform being adapted to bring each truck, one by one, in longitudinal operative relation to the said platform.

2. A storage building comprising a room narrower than twice the length of one of the trucks to be used therein, a series of two wheeled trucks, means to operate all the trucks to bring each one to the end of the building successively, and a cam track to turn the trucks around one at a time at each end of the building, an overhanging platform at one end of the building to allow wheeled vehicles to drive on the trucks, said cam track at the end adjacent to the platform being adapted to bring each truck, one by one, in longitudinal operative relation to the said platform.

3. A storage building comprising a room narrower than twice the length of one of the trucks to be used therein, a series of two wheeled trucks, caster wheels to support the trucks at each end, means to operate all the trucks to bring them to the opposite ends of the building one at a time, a roller carried on a vertical shaft by each truck, and a cam track cooperating with the roller to turn the trucks one at a time at each end of the building, an overhanging platform at one end of the building to allow wheeled vehicles to drive on the trucks, said cam track at the end adjacent to the platform being adapted to bring each truck, one by one, in longitudinal operative relation to the said platform.

4. A storage building comprising a room, a series of two wheeled trucks, caster wheels at the ends of the trucks to hold them substantially level, a chain connecting all the trucks, means to drive the chain to carry the trucks around the room in two lines, and means to turn the trucks around at each end of the room one at a time, and an overhanging platform at one end of the room to allow wheeled vehicles to drive on the trucks, said truck turning means adjacent the platform being adapted to bring the trucks in longitudinal operative relation to the platform.

5. A storage building comprising a room narrower than twice the length of one of the trucks to be used, a series of trucks having two large centrally placed wheels, caster wheels for supporting the ends of the trucks, a chain connecting all the trucks, means to drive the chain to carry the trucks around the room in two lines, an overhanging platform to allow wheeled vehicles to drive on the trucks, and a cam track for turning the trucks at the ends of the room one at a time to bring the trucks, one by one, into longitudinal operative relation to the platform.

6. A storage building comprising a room narrower than twice the length of one of the trucks to be used therein, a series of trucks having two centrally positioned supporting wheels, caster wheels at the ends of the trucks, means to move all of the trucks to bring each one to the end of the building successively, and a cam track to direct the truck movement around the building, the trucks being turned at opposite ends of the building one at a time, and an overhanging platform at one end of the building leading from two directions from different levels, said cam track adjacent said platform being adapted to successively bring the trucks, one by one, in longitudinal operative relation with each direction of entrance onto and from said platform.

7. A storage building comprising a room, having a greater length than width; a series of two wheeled trucks, means to operate all the trucks to bring each one to the ends of the building successively, a cam track to turn the trucks around one at a time at each end of the building, and an overhanging platform at one end of the building, said cam track adjacent said platform being adapted to successively bring the trucks, one by one, in longitudinal operative relation with said platform.

In testimony whereof I have hereunto set my hand this 28th day of March, A. D. 1928.

JOSEPH D. BELL.